Dec. 30, 1947.  A. H. LAMB  2,433,566
PROCESS FOR MANUFACTURING PHOTOELECTRIC CELLS OF THE DRY DISK TYPE
Filed July 22, 1942
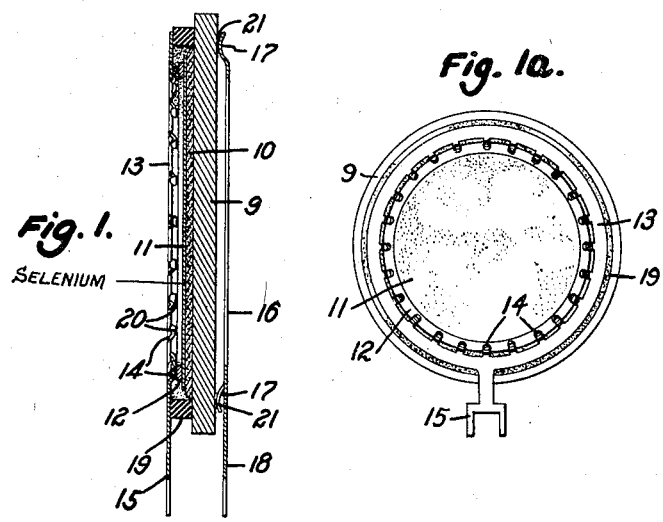
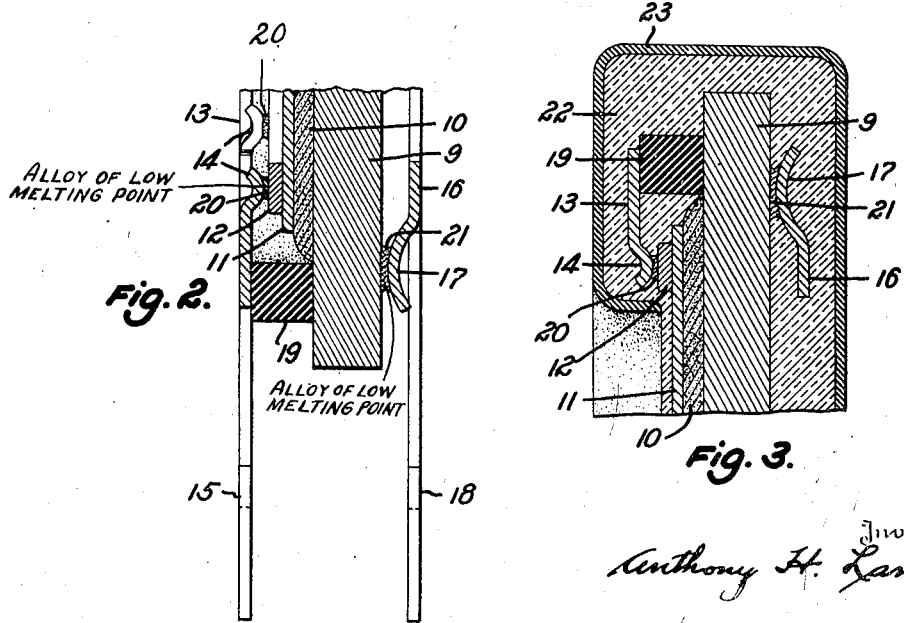
Inventor:
Anthony H. Lamb,
By Pierce & Scheffler,
Attorneys.

Patented Dec. 30, 1947

2,433,566

UNITED STATES PATENT OFFICE 2,433,566

PROCESS FOR MANUFACTURING PHOTO-ELECTRIC CELLS OF THE DRY DISK TYPE

Anthony H. Lamb, Hillside, N. J., assignor to Weston Electrical Instrument Corporation, Newark, N. J., a corporation of New Jersey Application July 22, 1942, Serial No. 451,973

8 Claims. (Cl. 136—89)

This invention relates to processes of manufacturing photoelectric cells of the dry disk type, and more particularly to improvements in the current collectors or terminal members of such cells.

Considerable care is required to prevent damage to the photoelectric cells during manufacture as the layer of active material, usually selenium, is relatively thin and the outer electrode layer is of approximately molecular thickness. These thin layers may be separated from each other and from the back electrode by mechanical shocks and vibrations, and/or they may be punctured or destroyed by local pressures applied non-uniformly to different portions of the photocell by the terminal connections. It is not possible to eliminate this possibility of damage from local pressure under the present practice of holding the resilient fingers of a current collector ring in contact with the outer electrode layer (or with a ring of soft metal upon the electrode layer) under a considerable pressure.

The photocells are usually enclosed in a protective housing and, in general, the contact pressure is determined by the dimensions of the housing; that is, the photocell and the resilient current collectors are placed within the main section of the housing, and the closure section of the housing is then applied to compress the resilient current collector upon the photocell. Such a construction provides good electrical contacts when the unit is first assembled but the output characteristics of the photocell may change during normal use. In fact, a certain percentage of the photocells may eventually fail completely. It has been recognized that the pressures at the contacting surfaces of the current collector and the outer electrode layer have damaged the thin photocell layers, and I have now identified another action that alters the photocell characteristics. I have found that moisture, fumes and the like attack the metals and increase the electrical resistance at the points of contact of the current collector fingers and the photocell electrode. Loss of resiliency of the metal collector fingers, mechanical vibration of the cell and/or thermally-produced expansions of the various components of the complete assembly serve cumulatively to aggravate this condition. The chemical action at the contacting surfaces, once initiated, is accentuated by the flow of current across or through the area under attack.

Various expedients have been proposed to eliminate these damages, from mechanical and chemical causes, to photocells within protective housings. It has also been proposed to mold the photocell and associated current collector elements in a transparent housing, but this assembly process has not been entirely satisfactory as it is difficult to maintain the component parts under a proper degree of compression during the molding operation. Furthermore, the process is open to the inherent defect that the plastic, while in a flowable state under the applied heat and pressure, is quite often forced under the contact fingers, thereby insulating the contact fingers from the photocell.

Objects of this invention are to provide processes of manufacturing photoelectric cells, that eliminate the mechanical pressure contacts of the prior art. Objects are to provide processes of manufacturing photocells that are characterized by a direct mechanical bonding of the current collector element to the outer electrode layer and, if desired, to the base electrode. An object is to provide a process for the manufacture of a photoelectric cell in which the current collector members are mechanically united to the photocell electrodes by fused metallic connections, and the cell and attached collector members are hermetically sealed within a transparent varnish or a block of a transparent resin.

These and other objects and advantages of the invention will be apparent from the following specification when taken with the accompanying drawings in which:

Fig. 1 is a central section, with parts broken away, of a photocell with fused-on terminal connectors embodying the invention, the thickness of the several parts being greatly exaggerated for clarity of illustration;

Fig. 1a is a front elevation of the photocell on a smaller scale;

Fig. 2 is a fragmentary sectional view, on a much larger scale, of the lower portion of the assembly illustrated in Fig. 1; and Fig. 3 is a similar fragmentary sectional view, on an enlarged scale, through the edge portion of an encased photocell.

In the drawings, the reference numeral 9 identifies the base plate, usually of iron, that carries a thin layer 10 of a light sensitive material, such as selenium, upon which a transparent or translucent electrode layer 11 is deposited. To insure a good electrical contact a metal ring 12 is sputtered or sprayed along the periphery of the electrode layer 11. The outer current collector comprises a metal ring 13 provided with a plurality of resilient bent fingers 14 and an integral extension 15 which serves as a means of connection to the external circuit. The other current collector comprises a metal ring 16 having resilient fingers 17 and an extension 18 for connecting to the external circuit. A washer 19 of suitable insulating material supports the collector ring 13 in proper position and eliminates the possibility of short circuits between said collector ring and the base plate 9. The washer 19 may be attached to the base plate 9 by cement or preferably, as will be apparent from the description of the novel features of the invention, merely by the spring pressure exerted against it by the collector ring 13. These basic elements of the photocell may be assembled or formed in any known or desired manner.

Present photocells are customarily assembled in a suitable housing in such manner that the resilient fingers of the current collectors are maintained under considerable compresison to assure good contact between the fingers and the coacting surfaces. Such constructions may provide good electrical contact when the cell is first assembled if the pressure on the electrode layer 11 does not immediately force that layer through the light-sensitive layer 10 to short circuit the cell. The sputtered ring 12 was intended to reduce the possibility of an immediate or a delayed puncturing of the light-sensitive layer 10 and to permit the use of higher contact pressure to reduce variations in contact resistance. Furthermore, the provision of a large number of resilient contact fingers 14 was expected to stabilize the current output on the theory that the eventual development of a poor contact under one or several fingers would not seriously reduce the cell output. Continued failure of photocells of the pressure contact type demonstrated that high contact pressure on a thick metal ring 12 did not insure a stable current characteristic.

I have found that a direct metallic bond between the collector fingers and coacting surfaces results in a good electrical contact which remains of permanent quality for the life of the cell. This bonding is achieved by employing a mercury-free alloy having a low melting point such as may be obtained by alloying proper proportions of tin, zinc, cadmium and/or bismuth. These alloys melt at relatively low temperatures, say 100-160 degrees Fahrenheit and may be employed as a fusing medium to unite the terminal members to the photocell without damaging the light-sensitive layer 10. Extremely low melting point alloys contain mercury and cannot be employed as mercury ruins the light-sensitive qualities of the selenium. The mechanical strength of the fused connection increases with the melting point of the alloy and I prefer to employ alloys that melt at about 150-158° F.

The invention therefore contemplates a direct mechanical and electrical bonding of the terminal members to the base plate 9 and the outer electrode 11 of the photocell. This bonding is not effected by a soldering or welding of the resilient contact fingers of the terminal members to the photocell electrodes but by a relatively low temperature fusing of interposed alloy metal to bond the parts mechanically and electrically to each other.

As illustrated, the resilient fingers 14 of the outer collector ring 13 are fused to the ring element 12 by alloy metal 20, and the fingers 17 of the back collector ring 16 are similarly bonded to the base electrode 9 by alloy metal 21. The bonding of the terminal member to the photocell may be effected in several ways so long as the photocell is not heated beyond the critical temperature, about 160° F., that will damage the light-sensitive layer of selenium. Attempts to solder or weld a terminal member to the outer electrode of a selenium type photocell were not successful and it has been the accepted opinion that it was impossible, or at least impractical, to obtain a mechanically strong bonding of a terminal member and the outer electrode layer of a selenium type photocell.

It may here be noted that the entire photocell assembly is a poor structure from the standpoint of mechanical strength as the selenium layer may be readily stripped from the base, and the thin outer electrode layer may be stripped from the selenium layer. Bonding alloys that melt at about 150° F. provide joints or intersurface connections of approximately the same strength as the intersurface connections between the photocell layers. Fused alloy connections can be made without damage to the selenium layer by placing the photocell-terminal assembly in a temperature-controlled oven or on an electrically-heated "hot-plate."

The bonding alloy may be applied to the contact fingers of the terminal members and to the coacting surfaces of the photocell before the parts are assembled and heated in the oven or on the hot plate. Alternatively, rings of proper size may be punched from a sheet of the bonding alloy and interposed between the terminal members and the photocell electrodes. In either case, a small weight is placed upon the assembly during the heating step to press the terminal members towards the photocell when the bonding alloy melts.

Photocell assemblies with mechanically bonded terminal members may readily be sealed against physical and chemical attack. The bonded assemblies may be dipped into a transparent protective varnish or lacquer, and dried. These operations may be repeated until the cell is encased within a protective layer of desired thickness. Plastic solutions are available which, when air dried, result in a hard transparent mass of good physical and light transmitting characteristics.

The mechanically bonded photocell assembly may be encased within a transparent casing of desired form by molding a mass of thermoplastic or thermosetting resin upon the photocell assembly. This molding operation may be applied to photocell assemblies that were previously waterproofed by dipping in a transparent varnish or, alternatively, may be applied directly to the mechanically bonded photocell assembly.

As shown in Fig. 3, the transparent waterproof coating 22 of lacquer or of molded resin encloses the photocell assembly and an opaque paint or enamel 23 may be sprayed or brushed upon the back of the assembly and upon the rim portion thereof that lies outside of the active surface of the photocell. There is no possibility of disturbing the desired electrical connections by the pressure incident to the molding operation as the current terminal members are mechanically bonded to the photocell electrodes by the alloy metal 20, 21. The varnish or lacquer coating is appropriate in some instances but, in general, it is preferable to mold relatively thick layers of a transparent resin upon the photocell to form a rigid casing.

It is to be understood that the invention is not limited to the particular embodiment herein shown and described. For example, the collector ring 12 may be omitted and the fingers 14 directly bonded to the outer electrode layer 11. This and other modifications that may occur to those skilled in the art fall within the spirit of my invention as set forth in the following claims.

I claim:

1. The process of imparting stable operating characteristics to a photocell of the dry disk type that comprises mechanically and electrically bonding a terminal member to the photocell by interposing between the outer photocell electrode and a terminal member an alloy having a melting point lower than the critical temperature that will damage the photocell, pressing the terminal member upon the interposed alloy and photocell, and heating the terminal member-alloy-photocell assembly to a temperature lower than said critical destructive temperature to unite the terminal member and the photocell by the melting of said alloy.

2. The process as recited in claim 1, in combination with the step of coating the photocell-terminal member assembly with a protective transparent material after the bonding of the terminal member to the photocell.

3. The process as recited in claim 1, in combination with the step of dipping the mechanically bonded photocell-terminal member assembly in a transparent insulating varnish.

4. The process as recited in claim 1, in combination with the step of molding a transparent insulating housing upon and about the bonded photocell-terminal member assembly.

5. The process as recited in claim 1, wherein said alloy is interposed between said terminal member and photocell by fusing the alloy upon the terminal member, and then superposing the alloy-carrying terminal member upon the photocell.

6. The process as claimed in claim 1, wherein said alloy is interposed between said terminal member and said photocell in the form of a ring of the bonding alloy.

7. The process of bonding the resilient fingers of a terminal member to the translucent outer electrode layer of a photocell that comprises coating the resilient fingers with an alloy having a melting point lower than the critical temperature that will cause damage to said photocell, pressing the coated fingers of the terminal member into engagement with the photocell, and heating the terminal member-photocell assembly to a temperature higher than the melting point of the alloy and lower than said critical temperature.

8. The process as recited in claim 7, in combination with the step of applying a contact layer to the edge portion of the outer photocell electrode for engagement with and bonding to the alloy-coated fingers of the terminal member.

ANTHONY H. LAMB.

REFERENCES CITED

The following references are of record in the file of this patent:

UNITED STATES PATENTS

| Number | Name | Date |
|---|---|---|
| 2,261,618 | Esseling et al. | Nov. 4, 1941 |
| 2,381,025 | Addink | Aug. 7, 1945 |
| 2,321,071 | Ehrhardt et al. | June 8, 1941 |
| 2,309,081 | Priessman et al. | Jan. 26, 1943 |
| 2,041,816 | Carpenter et al. | May 26, 1936 |
| 1,797,161 | Strohl et al. | Mar. 17, 1931 |
| 2,140,725 | Treacy | Dec. 20, 1938 |
| 2,173,249 | DeBoer et al. | Sept. 19, 1939 |
| 2,244,264 | Seitz | June 3, 1941 |
| 1,993,084 | Brewer | Mar. 5, 1935 |
| 2,172,232 | Wilson | Sept. 5, 1939 |
| 2,183,256 | Gabler | Dec. 12, 1939 |
| 2,114,591 | Clark | Apr. 19, 1938 |